S. G. NEAL.
AIR BRAKE APPARATUS.
APPLICATION FILED APR. 4, 1918.

1,335,291.

Patented Mar. 30, 1920.
6 SHEETS—SHEET 1.

Inventor
Spencer G. Neal
By his Attorney

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

1,335,291.

Specification of Letters Patent.  Patented Mar. 30, 1920.

Application filed April 4, 1918. Serial No. 226,650.

*To all whom it may concern:*

Be it known that I, SPENCER G. NEAL, a citizen of the United States, and resident of the borough of Manhattan, city, county, and State of New York, have invented certain new and useful Improvements in Air-Brake Apparatus, of which the following is a specification.

This invention relates more particularly to improvements in that type of air brake apparatus illustrated in my Patent No. 1,183,103, dated May 16, 1916, and in my application for patent filed August 1, 1917, Serial No. 183,886.

The object of the invention is to simplify and improve the construction of the triple valve designed for use in air brakes of the type shown and described in said patent, and in the aforesaid application for patent.

Referring to the various parts by reference characters, A designates the quick-release and service section of the triple valve; B the emergency and change-over section; C the emergency reservoir; D the brake cylinder; E the train pipe reservoir; and F the quick-action reservoir.

The service section and the emergency section of the triple valve are bolted to opposite sides of a depending web H of a supporting bracket G, the quick-action reservoir F being formed in said bracket. The service section of the triple valve is bolted to the face I of the web H, and the emergency section of the triple valve is bolted to the face J of said web, the meeting faces of the two sections of the triple valve and the faces of the web being formed with corresponding and registering ports and passages, as will be more fully hereinafter described.

As illustrated in the drawings, the section A of the triple valve contains the parts by which the service applications of the brakes are secured and through which the release of the brakes is obtained, and also through which the apparatus is charged. This section also contains the parts by means of which the quick release of the brakes is secured by an increase of train pipe pressure. Section B of the triple valve contains the parts which control the emergency applications of the brakes, and those parts which seal the train pipe reservoir from the train pipe and connect it to the brake cylinder upon an emergency application of the brakes, and also the devices by means of which the train pipe reservoir will be sealed from the brake cylinder whenever the brake cylinder pressure equals or exceeds the pressure in the train pipe reservoir.

The train pipe 1 leads through ports in the web H, into the main train pipe chamber 2, said chamber being in section A of the valve. Above said chamber 2 and separated therefrom by the main abutment or diaphragm 3, is an emergency reservoir chamber 4 in constant communication with the emergency reservoir through passage 5. In order that said abutment 3 may operate valves hereinafter described, the same is made to coöperate with a vertical valve stem 6 provided with a reduced upper end. The main diaphragm 3 carries a sliding head 8 which has a working fit around the stem 6 and is provided with a downwardly facing valve seat 9, which coöperates with the charging valve 11, this latter valve being a part of stem 6. Said valve stem 6 forms a guide for the sliding head 8, so that the air pressure upon the diaphragm 3 may be utilized to positively open and close said valve 11.

Referring more in detail to the construction and operation of the valve device within the head 8, (see Figs. 3 and 12) a plurality of ports 15 lead through the wall of the head 8 to admit air to a clearance 14 within said head. The upper portion of stem 6 is provided with a somewhat reduced portion which forms the valve 11 already referred to. Above said valve 11 the stem is provided with a more reduced portion 17, the clearance around which will conduct the air to chamber 4 from around the stem 6 when the valve 11 is opened.

Figures 3, 4:
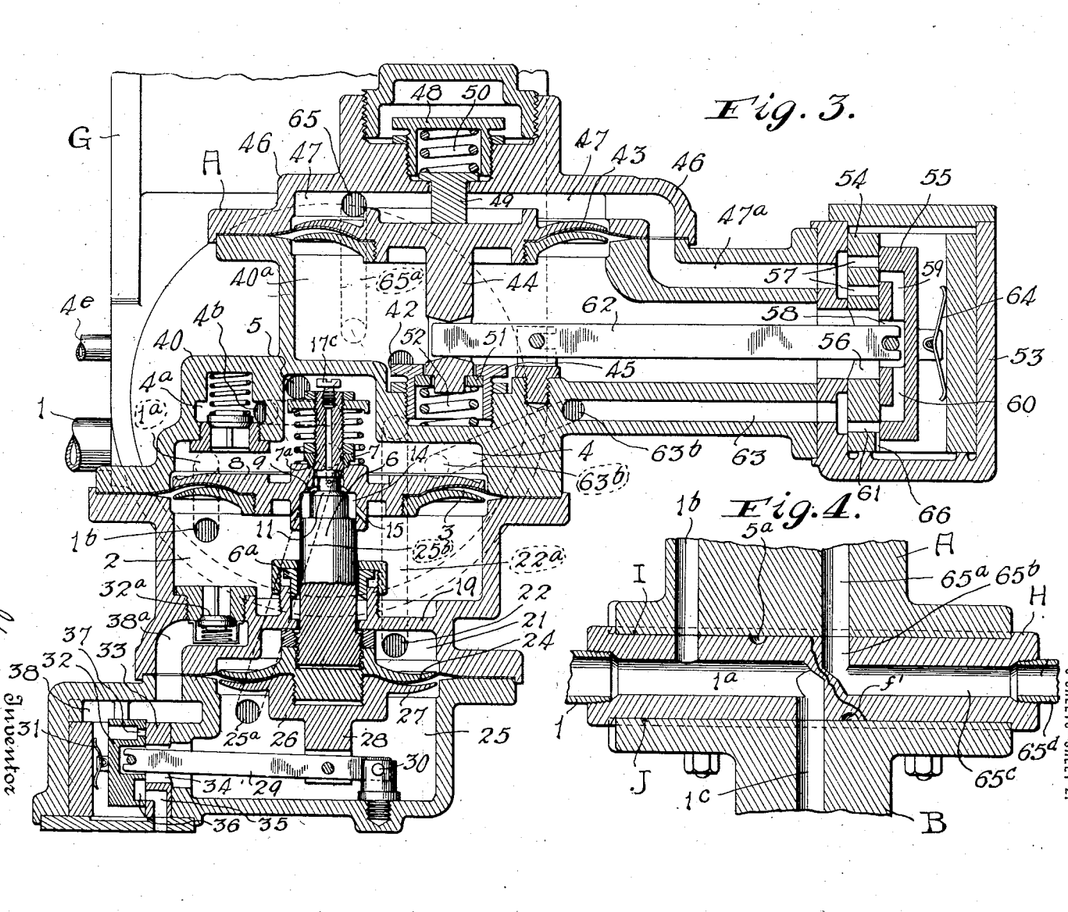
Fig. 3 a vertical central sectional view of the service section of the triple valve.
Fig. 4 a horizontal sectional view of the supporting bracket, and a portion of the service section and emergency section of the triple valve taken on the line IV—IV of Fig. 6.

Secured to the reduced portion 17 of the stem 6 above the abutment 3, is a downwardly tapered valve 7 which is adapted to fit a corresponding seat 7$^a$ in the top of the head 8 of the abutment 3. The valve 7 is so placed on the stem 17 that when valve 11 is seated valve 7 will be a considerable distance above seat 7$^a$. Valve 7 is locked in its adjusted position by a suitable lock nut, as shown in Fig. 3. On the upper end of the stem 17 is a disk 7$^b$, between which and the upper surface of the sliding head 8 is confined a coil spring 7$^c$. This spring exerts a force tending to bring valve 11 to its seat 9. The disk 7$^b$ is locked on the stem 17 by means of a suitable lock nut, and, of course, may be adjusted in order to cause the spring 7$^c$ to exert the desired pressure on the abutment 3. There is a considerable clearance between the sliding head 8 and the stem 17, so that when the head is between the valves 7 and 11 there will be an air passage of considerable capacity through the abutment.

The stem 17 is bored axially as at 17$^a$, from its upper end to the transverse port 17$^e$. A governing screw 17$^c$ is threaded into the end of the bore 17$^a$, said screw being longitudinally apertured. The port 17$^e$ opens into an annular groove in part 17, between the valve seats 7$^a$ and 9.

Figures 5, 12:
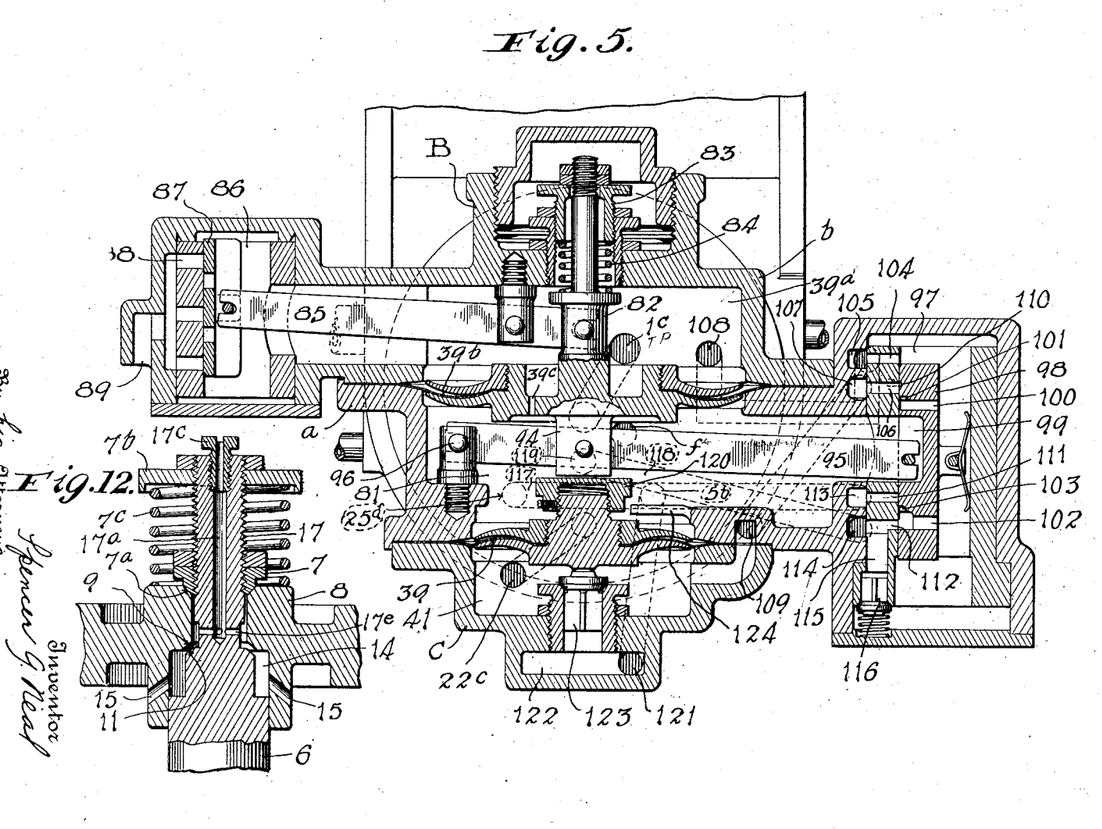
Fig. 5 a vertical central sectional view of the emergency section of the triple valve.
Fig. 12 a detail vertical sectional view of the triple valve, showing the emergency reservoir charging valve.
Figure 6:
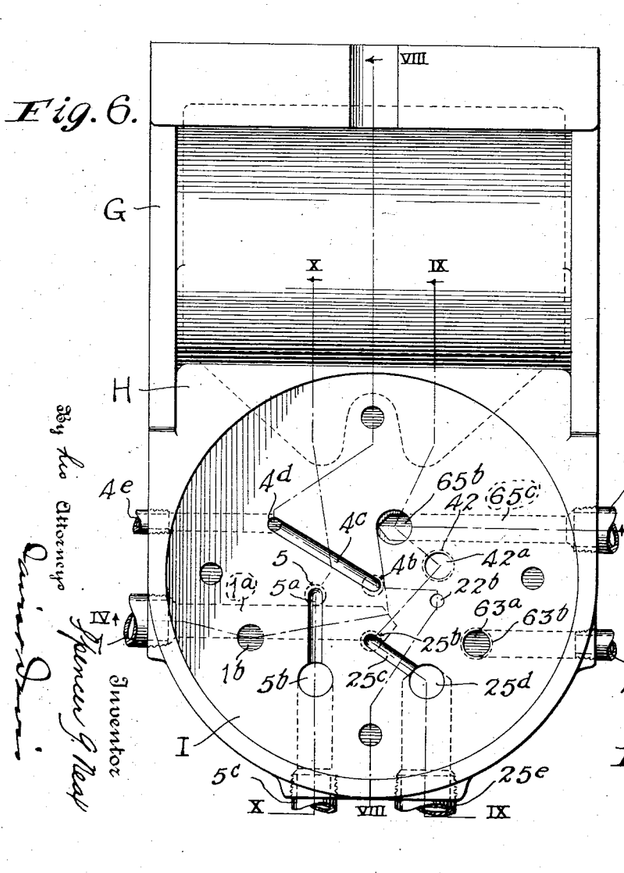
Fig. 6 a side elevation of the service side of the supporting bracket.
Figure 7:
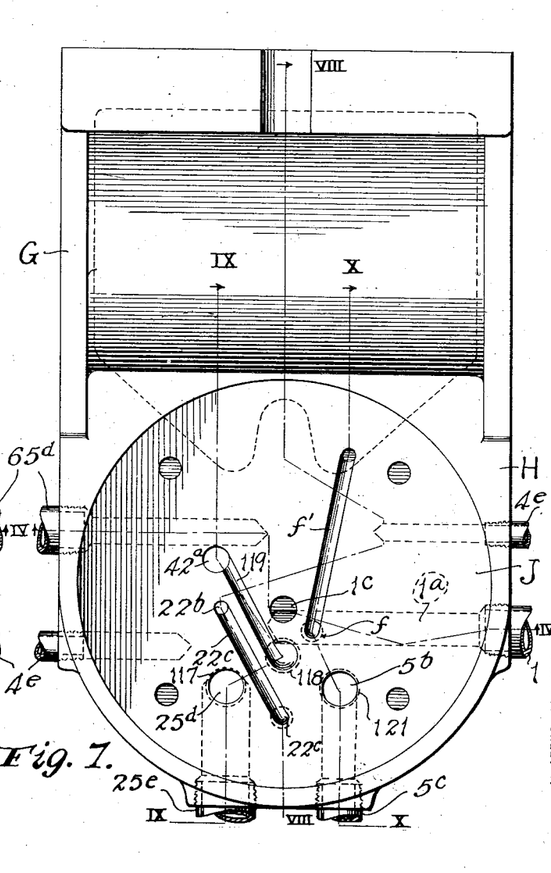
Fig. 7 a similar view of the emergency side of the supporting bracket.

Upon a reduction of train pipe pressure in chamber 2 for the purpose of securing a service application of the brakes, abutment 3 is moved downwardly by the superior pressure in chamber 4, and valve 11 is seated on the valve seat 9, thereby closing communication between the chambers 2 and 4. Upon an increase of pressure in train pipe chamber 2 for the purpose of securing a release of the brakes, the abutment 3 and the stem 6 will be moved upwardly, thereby moving the lever 29 and shifting the slide valve 32 to close the service port 37 and open the exhaust port 36—35. This upward movement of the abutment continues until the lock ring on the stem 6 abuts against the under side of the cross wall 19. Should the pressure in chamber 2 exceed the pressure in chamber 4, the abutment 3 will be moved upwardly to the valve 7, as indicated in Figs. 3 and 12, and air will slowly pass valve 11 and through ports 17$^e$, 17$^a$, and screw 17$^c$ into chamber 4. When the pressure in chamber 4 has equalized with the pressure in chamber 2 the spring 7$^c$ will move the abutment downwardly to bring valve 11 to valve seat 9. When the sliding head 8 of abutment 3 is between the valves 7 and 11, air from chamber 2 may pass around said valves to chamber 4, if the pressure in chamber 2 exceeds pressure in chamber 4.

In originally charging the apparatus if the rise of train pipe pressure is rapid, air will pass from chamber 2 around valve 11, slowly through 17$^e$, bore 17$^a$ and screw 17$^c$ to chamber 4 and to emergency reservoir. If the rise of pressure in the train pipe and in chamber 2 is slow, air will pass rapidly and in considerable quantities around valve 11, through the clearance between the head 8 and the stem 17, around valve 7, into chamber 4, and at the same time air will pass through the bore 17$^a$ and screw 17$^c$. This will provide a very quick charge of the chamber 4 and emergency reservoir at practically the same rate as the rise in train pipe pressure.

It is only when there is a considerable excess pressure in chamber 2 that the valve 7 will be seated and the slow charge will take place through the ports in the stem 17 and screw 17$^c$.

Beneath the train pipe chamber 2 and separated therefrom by a cross wall 19 is a chamber 21. An equalizing abutment 24 extends across the lower side of the chamber 21 to separate said chamber from an equalizing chamber 25. Chamber 21 is vented to atmosphere through port 22 during service applications of the brake. In the embodiment of the invention illustrated in the drawings, the main abutment 3 has about twice the area of the equalizing abutment 24. Therefore, the reduction of train pipe pressure ten pounds will cause approximately twenty pounds pressure to be built up in the brake cylinder and in the equalizing chamber 25 before there will be enough pressure beneath said equalizing abutment to lift the rod 6 and close the service port 37, as will be more fully hereinafter set forth.

The valve stem 6 extends downwardly through a stuffing box or packing gland 6$^a$, its lower end within the chamber 21 being screwed into the hub of the upper flange or disk of the equalizing abutment 24. On said stem above the said flange is screwed a limiting collar which is adapted to engage the under side of the cross wall 19 to limit the upward movement of the abutment 24. Screwed on to the central depending stem of the abutment 24 is a cap 26 which is formed at its upper end with an outwardly extending circular flange 27 which forms the support for the lower side of the abutment 24, this support being within the equalizing chamber 25. The chamber 25 is in communication with the brake cylinder through a passage 25ª. Depending from the cap 26 is a slotted stem 28 in which is pivoted a substantially horizontal lever 29, the shorter arm of said lever being pivoted to a rigid post 30 supported on the bottom wall of the chamber 25. The free end of the longer arm of said lever is connected by a pin-and-slot or other form of connection, to a slide valve 32, said valve being held to its seat by a spring 31. The valve seat 33 is formed with a large port 34 through which the lever 29 extends; and is also formed with an exhaust port 35 which communicates with the atmosphere. The slide valve is formed in its face with an exhaust port 36 which is adapted to place the exhaust port 35 in communication with the port 34 when the valve 32 is in its full released position, as shown in Fig. 3. The slide valve is also formed with a service port 37 which is adapted to place the chamber 38 in communication with the chamber 25 when the slide valve is in application position. Chamber 38 is in communication with the main train pipe chamber 2 through a passage 38ª, a check valve 32ª being arranged in said chamber to prevent the passage of air from chamber 38, into the main train pipe chamber, said valve readily opening to permit air to pass from the train pipe chamber 2 into the chamber 38 and thence through the port 37 into the equalizing or brake cylinder chamber 25 and to the brake cylinder.

It is manifest that upon a reduction of train pipe pressure for the purpose of securing a service application of the brakes, abutment 3 will be moved downwardly by the superior pressure in chamber 4. This downward movement of the abutment 3 will carry downwardly the stem 6 and abutment 24 and move lever 29 and slide valve 32. This will bring the port 37 in communication with port 34, thereby placing chamber 38 in communication with chamber 25, at the same time closing the exhaust 36—35. When the brake cylinder pressure has been built up in equalizing chamber 25 sufficiently to assist the reduced train pipe pressure in chamber 2 in overcoming emergency reservoir pressure in chamber 4, the slide valve 32 will be moved back to lap position. Should the brake cylinder pressure leak down, diaphragm or abutment 3 will be again depressed thereby again moving the slide valve to place the train pipe chamber 2 in communication with equalizing chamber 25 to supply train pipe air to compensate for the brake cylinder leakage.

Secured to the top of the main body portion of the service section of the triple valve is a supplemental body part 40, said supplemental body part forming the upper wall of the emergency reservoir chamber 4 and containing the supplemental train pipe chamber 40ª, said chamber being connected to the train pipe through a passage 42 and connected parts. A vertically movable quick-release diaphragm 43 forms the upper wall of the supplemental train pipe chamber 40ª, said diaphragm carrying a central depending stem 44 which is guided at its lower end in a vertically adjustable sleeve 45. The diaphragm 43 is secured in position by a cap plate 46 which forms a train pipe reservoir chamber 47 directly over the said diaphragm. Adjustably secured in the cap plate 46 is an inverted cup 48 in which is arranged a spring 50. Extending into this cup through the wall of the cap plate is a movable plug 49 the lower end of said plug extending into the chamber 47 and normally engaging the upper surface of the hub of the abutment 43 directly over the center thereof. The upper end of the plug 49 is flanged and is in engagement with the spring 50. By adjusting the inverted cap 48 the pressure of the spring on the plug 49 may be varied.

Within the sleeve 45 at the upper end thereof is arranged a disk 51 against which bears the lower end of the stem 44. Within the sleeve 45 is arranged a spring 52 which bears against the disk 51 and normally maintains it against an inwardly extending flange at the upper end of sleeve 45. The springs 50 and 52 oppose each other and normally maintain the abutment 43 in its normal position, any movement of said abutment in either direction compressing one of said springs.

The supplemental train pipe chamber 40ª is enlarged laterally, and connected to the end thereof is a quick-release valve chamber 53 in which is arranged a valve seat 54 on which a quick-release slide valve 55 operates. The chamber 40ª is in communication with a large port 56 in the slide valve seat 54: and chamber 47 is in communication with twin ports 57 through a passage 47ª. The slide valve is formed with a large central port 58 which is always in communication with port 56 and chamber 40ª; and extending upwardly from said port 58 is a port 59 which is adapted to be brought into register with one or the other of the twin ports 57. Extending downwardly from the main port 58 is a port 60 which is adapted to be brought to register with a port 61 in the slide valve seat, this latter port being always in communication with a passage 63 leading to the auxiliary reservoir through passage 63ᵇ. The slide valve 55 is maintained yieldingly on its seat by means of a spring 64.

Pivotally mounted in the chamber 40ᵃ is a quick-release lever 62 pivoted in a block mounted in said chamber, the longer arm of said lever being loosely connected to the slide valve 55 through the port 56, and its shorter arm extending through a slot in the stem 44 of the abutment 43. The walls of the said slot are inclined with respect to each other so that the lever will engage said stem on a knife-edge at the axial center of said stem. It is manifest that the slide valve will be moved through the lever 62 in response to the movements of the abutment 43. The chamber 47, which constitutes the train pipe reservoir chamber, is in communication with the train pipe reservoir through passage 65 and the connected ports, as will be more fully hereinafter described.

The quick-release features of the triple valve operate as follows:

Upon an increase of train pipe pressure train pipe air flows into chamber 40ᵃ through passage 42, as will be more fully hereinafter described, lifting the diaphragm 43. This operation through the lever 62 will move downwardly the slide valve 55 bringing port 60 into communication with passage 63 through port 61 and also bringing port 59 into communication with passage 47ᵃ and chamber 47 through the lower one of the twin ports 57. This will permit emergency reservoir air to flow through passage 63 and the aforesaid ports and passages into chamber 40ᵃ and thence through port 42 to the train pipe and also through passage 47ᵃ and chamber 47 to the train pipe reservoir which is in communication with said chamber through passage 65. Port 60 must be brought into register with port 61 before port 59 registers with the lower twin port 57. The purpose of this is to insure emergency reservoir air passing into chamber 40ᵃ and raising the pressure therein before there can be an equalization of pressures in chambers 47 and 40ᵃ. The ports will be so proportioned as to permit the emergency reservoir to discharge into the train pipe through chamber 40ᵃ before there can be an equalization of pressures in chambers 47 and 40ᵃ.

When the pressures in chambers 47 and 40ᵃ have equalized the abutment 43 will be returned to its normal position by spring 50, and with it will return the lever 62 and the slide valve 55.

Upon a reduction of train pipe pressure for a service application of the brakes, train pipe reservoir air will pass into the supplemental train pipe chamber 40ᵃ through port 59 and the upper twin port 57 and thence through passage 42 and the connected parts to the train pipe and brake cylinder until there is an equalization of pressures in chambers 47 and 40ᵃ so that the train pipe reservoir during all service applications of the brakes forms merely an enlargement of the train pipe and is for the purpose of augmenting the volume of train pipe air for braking purposes. During all service applications of the brakes the pressures in the train pipe reservoir and chambers 47 and 40ᵃ vary with the train pipe pressure, there being only a slight differential of pressure in chamber 47 and in the train pipe chamber 40ᵃ, due to the tension of the spring 52 which assists train pipe pressure in 40ᵃ in returning abutment 43 to its normal position and moving the valve 55 to lap position.

Figures 8, 9, 10:
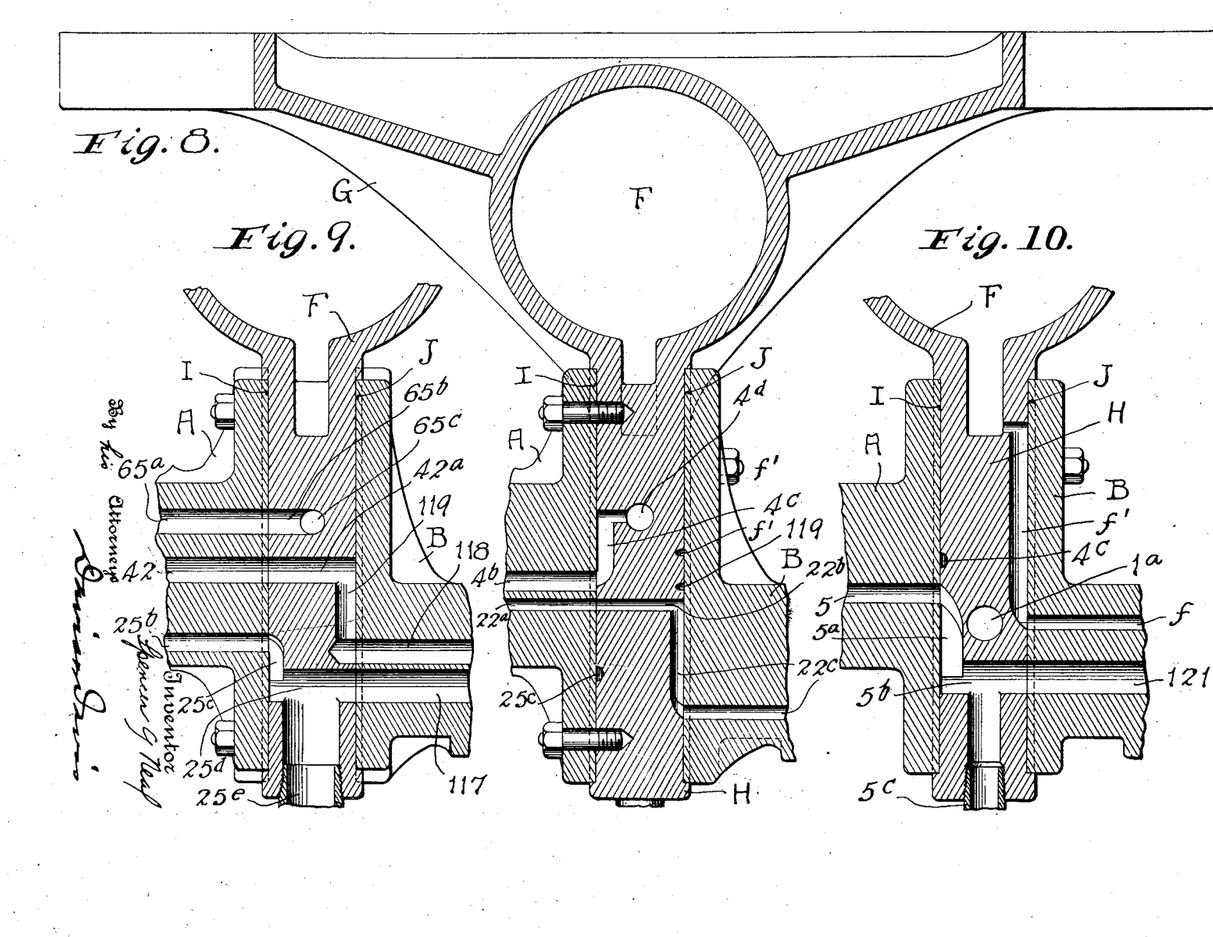
Fig. 8 a vertical sectional view of the supporting bracket and a portion of the service and emergency sections of the triple valve, taken on the lines VIII—VIII of Figs. 6 and 7.
Fig. 9 a similar view taken on the lines IX—IX of Figs. 6 and 7.
Fig. 10 a similar view taken on the line X—X of Figs. 6 and 7.
Figure 11:
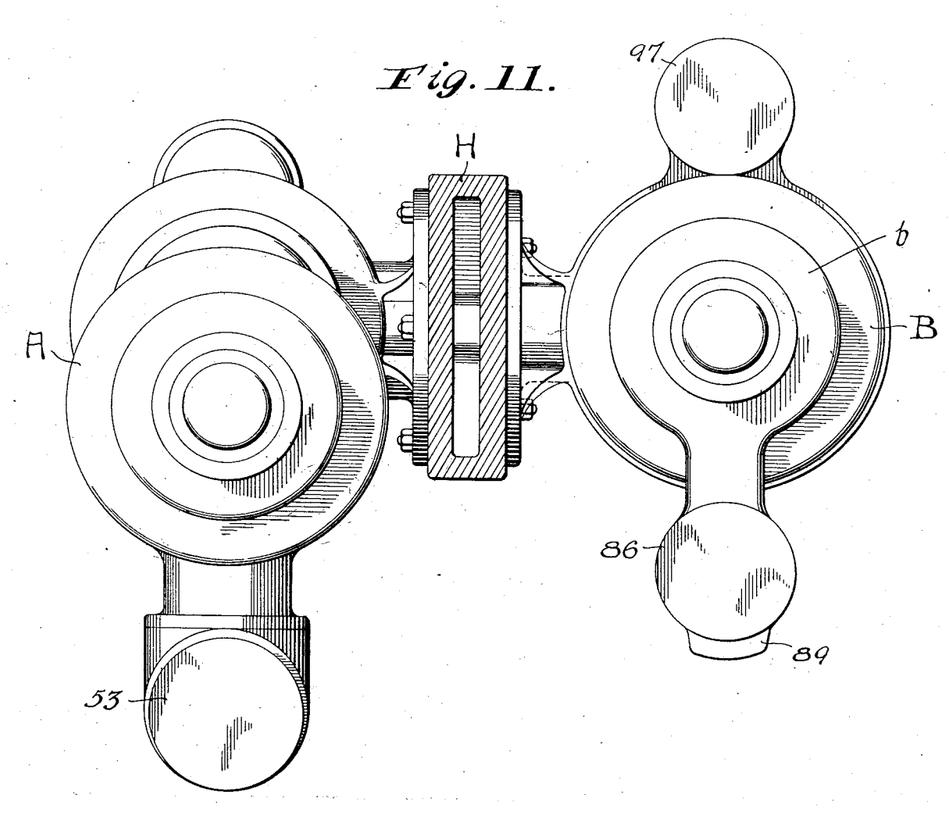
Fig. 11 a horizontal sectional view of the supporting web, showing the service and emergency sections of the triple valve in plan view.

The train pipe 1 is connected to a passage 1ᵃ in the web H of the supporting bracket, and said passage is connected by means of a port 1ᵇ to the train pipe chamber 2 of the triple valve so that the train pipe is in direct communication through said ports and passages with said train pipe chamber (Fig. 4). The emergency reservoir chamber 4 is provided with the port 5 which registers with a passage 5ᵃ in the face I of the web H, said passage 5ᵃ communicating with a port and passage 5ᵇ which is connected by pipe 5ᶜ to the emergency reservoir so that said chamber 4 is in direct communication at all times with said reservoir (Fig. 10). The train pipe reservoir is in communication with chamber 47 through port 65, passage 65ᵃ, the lower end of which communicates with a port 65ᵇ in the face I of the web H, said port communicating with a passage 65ᶜ and thence through pipe 65ᵈ with the train pipe reservoir (Fig. 9). Chamber 21 is vented to atmosphere through port 22, passage 22ᵃ which communicates at its upper end with a port 22ᵇ in the face I of the web H, said port extending through the web and communicating with a groove 22ᶜ in the face J of said web, this latter passage being connected at its lower end to chamber 41 of the emergency section of the triple valve and thence to atmosphere, as will be more fully hereinafter described (Fig. 8).

Brake cylinder chamber 25 is connected to the brake cylinder through port 25ᵃ, passage 25ᵇ, which at its upper end communicates with a groove 25ᶜ in the face I of the web H, this latter groove communicating with a port 25ᵈ which is in communication with pipe 25ᵉ, said pipe being connected to the brake cylinder (Fig. 9).

Figure 1:
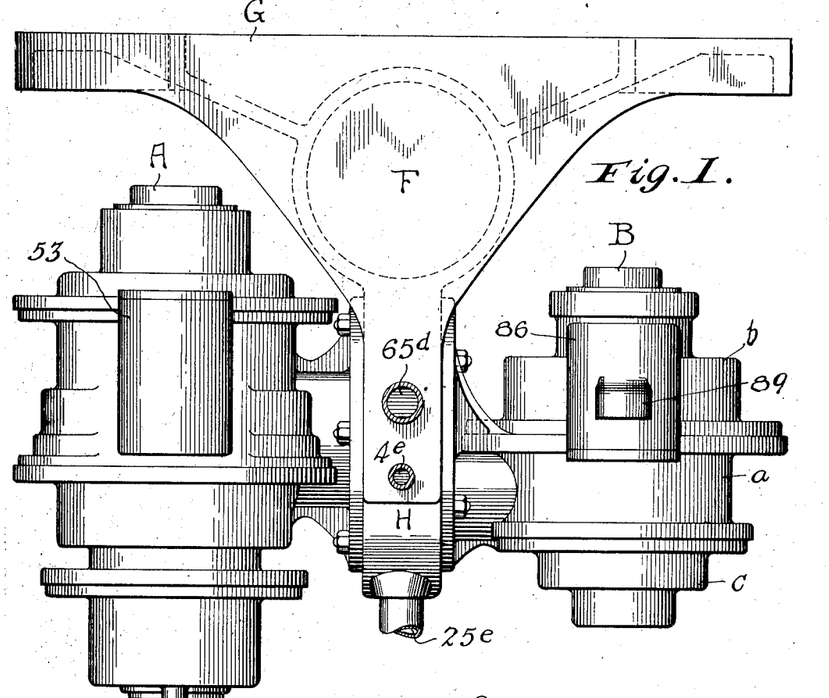
Figure 1 is a side elevation of the triple valve and its supporting bracket.
Figure 2:
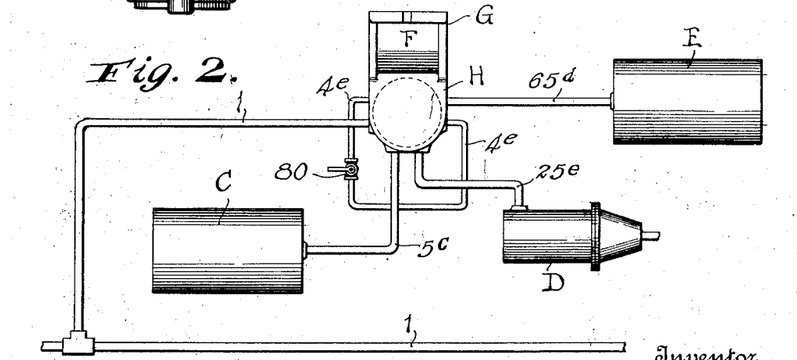
Fig. 2 a diagrammatic view of a braking unit, including the triple valve, the brake cylinder and the various reservoirs.

In order to discharge the air from the emergency reservoir into the train pipe for a quick release of the brakes, a chamber 4ᵃ is formed in the triple valve section A, above the emergency reservoir chamber 4, the said chambers being in communication through a passage which is closed by a downwardly seating check valve. A spring of suitable tension holds said check valve to its seat and prevents the passage of air from chamber 4ᵃ into the chamber 4, but permits air to pass from this latter chamber past the check valve into chamber 4ᵃ. Chamber 4ᵃ is connected by a port 4ᵇ with a groove 4ᶜ in the face I of the web H, said groove being in communication at its upper end with a port and passage 4ᵈ which is connected to a pipe 4ᵉ. Pipe 4ᵉ is connected to a port and passage 63ᵃ formed in the face I of the web H, this latter port communicating through port 63ᵇ with passage 63. In the pipe 4ᵉ is arranged a maintaining valve 80 (see Fig. 2), which corresponds in operation to the similar valve 80 of application Serial No. 183,886. When it is desired that the triple valve shall operate in quick-release said valve 80 is opened, said valve 80 being closed when it is desired that the triple valve shall operate in graduated release.

Port 61 is connected to the interior of the valve chamber 53 by a small leak port 66 so that there always will be pressure in said valve chamber to hold the slide valve to its seat.

The construction and operation of the parts contained in the emergency section B of the triple valve are as follows:

The emergency train pipe chamber 39ᵃ is connected directly to the train pipe through passage 1ᶜ and its connected ports which communicate with passage 1ᵃ, as will be more fully hereinafter described. A portion of the lower wall of the chamber 39ᵃ is formed by a movable quick-action abutment 39ᵇ said abutment also forming a portion of the upper wall of the quick-action chamber 81. The chamber 39ᵃ is in communication with the quick-action chamber 81 through a small leak port 39ᶜ formed through the abutment 39ᵇ. A portion of the lower wall of the quick-action chamber is formed by the movable emergency abutment 39 and below the said emergency abutment is formed the emergency brake cylinder chamber 41. The quick-action chamber 81 is formed in a central casting $a$; the emergency train pipe chamber 39ᵃ is formed in an upper casting $b$; and the emergency brake cylinder chamber 41 is formed in a lower casting $c$, said castings being secured together by suitable bolts to form the emergency section of the triple valve. The quick-action chamber 81 is in communication with the quick-action reservoir F through passage $f$ which communicates at its inner end with a groove $f^1$ in the face J of the web H, the upper end of said groove communicating through a suitable port with the quick-action reservoir F.

Extending upwardly from the abutment 39ᵇ is a central stem 82 which is guided in a cap 83 adjustably mounted in the upper wall of the casting $b$. Surrounding said stem and bearing between a collar thereon and the lower end of the cap 83, is a spring 84 the tension of which may be varied by adjusting the said cap. On the upper end of the stem 82 is secured an adjustable stop nut which is adapted to be locked to the stem and to engage the upper end of the cap 83 to limit the downward movement of the stem 82 and the connected abutment 39ᵃ. Screwed into the upper end of the casting $b$ is a cap which incloses and protects the upper end of the stem 82 and the cap 83. By removing said cap access may be had to these parts for ready adjustment. Pivoted in a suitable fulcrum block in the chamber 39ᵃ is a lever 85, the shorter arm of which extends into a slot in the stem 82 and is loosely engaged by a transverse pin extending through said stem, so that said lever will be vibrated on its pivot by the vertical movement of the diaphragm 39ᵇ. Connected to the outer end of the chamber 39ᵃ is a valve casing 86 in which is arranged a vertically movable slide valve 87 adapted to open and close ports 88 which lead to the atmosphere through an exhaust port 89. The valve seat is formed with a plurality of ports and the slide valve is of grid form in order to quickly exhaust chamber 39ᵃ to atmosphere when the valve is in its open position. The valve 87 is held to its seat by the air pressure within chamber 86 and by suitably arranged springs. It is manifest that an upward movement of the diaphragm 39ᵇ will result in opening valve 87 and venting the emergency train pipe chamber 39ᵃ to atmosphere.

The abutment 39ᵇ is formed with a central depending post 94 which extends into the quick-action chamber 81. In said chamber and pivotally connected to the post 94 is a lever 95, said lever being pivoted at one end at 96 on a suitable post within said chamber 81, and connected to the post 94 at a point intermediate its ends. Connected to the outer end of the chamber 81 is a valve casing 97 in which is arranged a vertically movable slide valve 98. Valve 98 is formed with a large central port 99 in its face, which port is always in communication with the quick-action chamber 81. The free end of the lever 95 is connected to the valve 98 by a pin-and-slot connection so that said valve will be moved vertically through the vibrations of said lever. The valve 98 is held to its seat by the air pressure within the chamber 97 and by a suitably arranged spring.

Extending through the slide valve 98 above the port 99 is a port 100 which is formed with an extension groove 101 in the face of the valve; and below the port 99 said valve is formed with a port 102 which has a short upwardly extending extension groove 103 also formed in the face of the valve. In the slide valve seat above the port 99 is formed a port 104 which communicates with a passage 105; and with a port 106 which communicates with a passage 107, passages 105 and 107 being formed in the valve casing. Passage 105 is connected to the chamber 39ª through the passage and port 108. In the face of the slide valve 98 and adapted to register with port 106 is a small vent groove 110 which, when the slide valve is in its normal or lap position, places port 106 and passage 107 in communication with the atmosphere. It is manifest, therefore, that chamber 41 is normally vented to atmosphere, and as chamber 21 is connected to chamber 41 through ports and passages 22, 22ª, 22ᵇ and 22ᶜ, as hereinbefore described, the said chamber 21 will be normally vented to atmosphere through the chamber 41. Chamber 39ª is normally in open communication with the interior of the valve casing 97 through port 108, passage 105 and port 104.

The valve seat below the port 99 is formed with two transverse ports 111 and 112. Port 111 communicates with passage 113 and port 112 communicates with passage 114. Port 112 also communicates with the interior of the valve casing 97 through a port 115, which port is closed at its lower end by an upwardly seating spring-pressed check valve 116. Passage 113 is connected through passage 117 to brake cylinder port 25ᵈ, and thence to brake cylinder through pipe 25ᵉ. Passage 114 is connected through passage 118 to port and groove 119 in the face J of the web H, and thence through port 42 to supplemental train pipe chamber 40ª in the service section of the triple valve.

It is to be noted that the valve chamber 97 is normally in open communication with the train pipe through port 104 and passages 105 and 108, chamber 39ª, and train pipe port 1ᶜ. The emergency train pipe chamber 39ª is normally in open communication with the train pipe through the port 1ᶜ.

The emergency abutment 39 is provided with an upwardly extending central contact block 120, which is vertically adjustable, and is adapted to engage the lower end of the depending post 94 carried by the quick-action abutment 39ᵇ. Below the emergency abutment 39 is formed the emergency brake cylinder chamber 41, said chamber being in communication with passage 107 through port and passage 109, the upper end of passage 109 being connected to passage 107 as shown clearly in Fig. 5. Chamber 41 is in communication with chamber 21 through port and passage 22ᶜ, port 22ᵇ, and passage 22ª, so that both chambers 21 and 41 are vented to atmosphere through port 110. Below the chamber 41 is formed a supplemental emergency reservoir chamber 122 which is in communication with the emergency reservoir through port and passage 121, said passage at its upper end being connected to port 5ᵇ in the web H, this latter port being in communication with pipe 5ᶜ which connects with the emergency reservoir as hereinbefore described. In the wall separating the chambers 41 and 122 is secured a valve sleeve which, at its upper end, is formed into a valve seat to receive a downwardly seating check valve 123. The valve sleeve is vertically adjustable to secure the proper position of the valve 123 with respect to the lower side of the abutment 39. In its normal position the abutment 39 engages the upper side of the valve 123 and holds it to its seat. The valve 123 is adapted to be lifted from its seat by the emergency reservoir pressure in chamber 122 when the abutment has been moved upwardly. A stop 124 is provided to limit the upward movement of the abutment 39.

The abutment 39ᵇ has approximately twice the movement of the abutment 39, the latter abutment having approximately $\frac{1}{16}$ of an inch movement whereas the abutment 39ᵇ has approximately $\frac{1}{8}$ of an inch movement. The purpose of this is to permit the abutment 39ᵇ to complete about one-half of its downward movement to close the exhaust valve 87 before it engages the stop block 120. Upon an equalization of pressures in chambers 39ª and 81 after an emergency application of the brakes, which equalization will take place through the leak port 39ᶜ, the spring 84 will force the diaphragm 39ᵇ downwardly and thereby close the exhaust valve 87 and move the slide valve 98 sufficiently to close ports 104 and 112, thereby cutting off the train pipe from the valve chamber while maintaining communication between the emergency reservoir and the brake cylinder port through the port extensions 101 and 103. This will maintain the brake cylinder pressure until the pressure has been raised in the quick-action chamber sufficiently to force the emergency diaphragm or abutment 39 downwardly to close the valve 123. This downward movement of the diaphragm 39 will permit the diaphragm 39ᵇ to complete its downward movement and thereby place the port 106 in communication with the atmosphere through port 110 and will close the brake cylinder port 111. In the final movement of the abutment 39 it moves downwardly slightly away from the post 94, as shown clearly in Fig. 5. The pressure from the quick-action chamber F and in chamber 81 forces the abutment 39 downwardly and maintains the valve 123 seated during all service applications of the brakes. Upon a slow reduction of train pipe pressure for a service application of the brakes there will be an equalization of pressures in chambers 39ª and 81 through the leak port 39ᶜ in the abutment 39ᵇ. Upon a sudden reduction in train pipe pressure, however, for the purpose of securing an emergency application of the brakes, equalization cannot take place through the leak port 39ᶜ and the superior pressure in chamber 81 will lift abutment 39ᵇ thereby opening the train pipe exhaust valve 87 and moving the slide valve 98 to first cut off the atmosphere exhaust port 110 and to then place valve chamber 97 in communication with passage 107 through port 100, and also to place the said valve chamber in communication with passage 113 through port 102. Train pipe air will then pass from valve chamber 97 through port 100, port extension 101 to passage 107, port 109, into chamber 41, lifting the abutment 39 and permitting emergency reservoir pressure in chamber 122 to lift valve 123. Emergency reservoir air will then pass through passages 109 and 107, port 106, slide valve port 100, into valve chamber 97, thence through ports 102 and 111, passages 113 and 25ᵈ to brake cylinder. As soon as there has been an equalization of pressures in chambers 39ᵃ and 81 through the leak port 39ᶜ, spring 84 will move the abutment 39ᵇ downwardly to close the exhaust valve 87 and return the slide valve 98 to lap position. As soon as the port 110 places chamber 41 in communication with the atmosphere, abutment 39 will be lowered by the pressure in chamber 81 and valve 123 will be seated.

What I claim is:

1. A triple valve comprising a train pipe chamber, an emergency reservoir chamber, a main movable abutment between said chambers, means for charging the emergency reservoir through said abutment upon a rise of train pipe pressure, a valve stem connected to said abutment, an equalizing abutment connected to said stem, an equalizing chamber below said equalizing abutment and connected to the brake cylinder, a lever in the equalizing chamber and connected to said equalizing abutment, and an exhaust valve operated by said lever to vent the equalizing chamber and the brake cylinder.

2. A triple valve comprising a train pipe chamber, an emergency reservoir chamber, a main movable abutment between said chambers, means for charging the emergency reservoir through said abutment upon a rise of train pipe pressure, a valve stem connected to said abutment, an equalizing abutment connected to said stem, an equalizing chamber below said equalizing abutment and connected to the brake cylinder, a lever in the equalizing chamber and connected to said equalizing abutment, and a slide valve connected to said lever and formed with ports adapted to connect the train pipe chamber with the equalizing chamber for a service application of the brakes, and to vent the said chamber for a release of the brakes.

3. A triple valve comprising a train pipe chamber, an emergency reservoir chamber, a main movable abutment between said chambers, means for charging the emergency reservoir through said abutment upon a rise of train pipe pressure, a valve stem connected to said abutment, an equalizing abutment connected to said stem, an equalizing chamber below said equalizing abutment and connected to the brake cylinder, a lever in the equalizing chamber and connected to said equalizing abutment, a passage connecting the equalizing chamber with the train pipe chamber around the equalizing abutment, and a valve in said passage to connect the train pipe chamber to the equalizing chamber for a service application of the brakes and to vent the equalizing chamber for a release of the brakes, said valve being connected to and operated by the lever in the equalizing chamber.

4. A triple valve comprising a train pipe chamber, an emergency reservoir chamber, a main movable abutment between said chambers, means for charging the emergency reservoir through said abutment upon a rise of train pipe pressure, a valve stem connected to said abutment, an equalizing abutment connected to said stem, an equalizing chamber below said equalizing abutment and connected to the brake cylinder, a lever in the equalizing chamber and connected to said equalizing abutment, a passage connecting the equalizing chamber with the train pipe chamber around the equalizing abutment, a valve in said passage to connect the train pipe chamber to the equalizing chamber for a service application of the brakes and to vent the equalizing chamber for a release of the brakes, said valve being connected to and operated by the lever in the equalizing chamber, and means to prevent air passing from the equalizing chamber to the train pipe chamber.

5. A triple valve comprising a train pipe chamber, an emergency reservoir chamber, a main movable abutment between said chambers, means for charging the emergency reservoir through said abutment upon a rise of train pipe pressure, a valve stem connected to said abutment, an equalizing abutment connected to said stem, an equalizing chamber below said equalizing abutment and connected to the brake cylinder, a lever in the equalizing chamber and connected to said equalizing abutment, a passage connecting the equalizing chamber with the train pipe chamber around the equalizing abutment, a slide valve in said passage to connect the train pipe chamber to the equalizing chamber for a service application of the brakes and to vent the equalizing chamber for a release of the brakes, said valve being connected to and operated by the lever in the equalizing chamber.

6. An air brake apparatus comprising a valve device, an emergency reservoir, a train pipe reservoir, means in the valve device operating upon a reduction of train pipe pressure to admit train pipe air to the brake cylinder for a service application of the brakes by train pipe pressure alone, a quick-release diaphragm, a slide valve having ports controlling communication between the emergency reservoir, the train pipe and train pipe reservoir, and a quick-release lever connected to said diaphragm and to said valve operating upon an increase of train pipe pressure for a release of the brakes to move said valve to permit emergency reservoir air to flow to the train pipe and to the train pipe reservoir.

7. An air brake apparatus comprising a valve device, an emergency reservoir, a train pipe reservoir, means in the valve device operating upon a reduction of train pipe pressure to admit train pipe air to the brake cylinder for a service application of the brakes by train pipe pressure alone, a quick-release diaphragm, a supplemental train pipe chamber being formed beneath said diaphragm and a train pipe reservoir chamber being formed above said diaphragm, a slide valve chamber connected to the supplemental train pipe chamber, a slide valve in said valve chamber, and a quick-release lever connected to the quick-release diaphragm and to said slide valve and operating upon an increase of train pipe pressure for a release of the brakes to move the slide valve to connect the emergency reservoir to the train pipe and to the train pipe reservoir chamber.

8. An air brake apparatus comprising a valve device, an emergency reservoir, a train pipe reservoir, means in the valve device operating upon a reduction of train pipe pressure to admit train pipe air to the brake cylinder for a service application of the brakes by train pipe pressure alone, a quick-release diaphragm, a supplemental train pipe chamber being formed beneath said diaphragm and a train pipe reservoir chamber being formed above said diaphragm, a slide valve chamber connected to the supplemental train pipe chamber, a slide valve in said valve chamber, a quick-release lever connected to the quick-release diaphragm and to said slide valve and operating upon an increase of train pipe pressure for a release of the brakes to move the slide valve to connect the emergency reservoir to the train pipe and to the train pipe reservoir chamber, and yieldable spring-pressed devices operating on opposite sides of the quick-release diaphragm to yieldingly hold it in its normal position with the slide valve in lap position.

9. An air brake apparatus comprising a train pipe, a valve device, an emergency reservoir, a train pipe reservoir, a brake cylinder, means in the valve device operating upon a reduction of train pipe pressure to admit train pipe air to the brake cylinder for a service application of the brakes by train pipe air alone, a quick-release diaphragm, a supplemental train pipe chamber formed in the valve device on one side of said diaphragm, means connecting said supplemental train pipe chamber with the train pipe, a train pipe reservoir chamber formed in said valve device on the opposite side of said quick-release diaphragm and connected to the train pipe reservoir, a slide valve chamber connected to the supplemental train pipe chamber, a slide valve therein, a quick-release lever connected to the quick-release diaphragm and to said slide valve, and yieldable means engaging said quick-release diaphragm to hold the slide valve in lap position, said diaphragm operating upon a reduction of train pipe pressure to connect the train pipe reservoir with the train pipe and operating upon an increase of train pipe pressure for a release of the brakes to connect the emergency reservoir with the supplemental train pipe chamber, and thence to the train pipe, and also to connect the emergency reservoir with the train pipe reservoir chamber.

10. An air brake apparatus comprising a train pipe, a valve device, an emergency reservoir, a train pipe reservoir, a brake cylinder, means in the valve device operating upon a reduction of train pipe pressure to admit train pipe air to the brake cylinder for a service application of the brakes by train pipe air alone, a quick-release diaphragm, a supplemental train pipe chamber formed in the valve device on one side of said diaphragm, means connecting said supplemental train pipe chamber with the train pipe, a train pipe reservoir chamber formed in said valve device on the opposite side of said quick-release diaphragm and connected to the train pipe reservoir, a quick-release lever connected to the quick-release diaphragm, a valve device connected to said lever, and yieldable means engaging said quick-release diaphragm to hold the valve device in closed position, said diaphragm operating upon a reduction of train pipe pressure to connect the train pipe reservoir with the train pipe and operating upon an increase of train pipe pressure for a release of the brakes to connect the emergency reservoir with the supplemental train pipe chamber, and thence to the train pipe, and also to connect the emergency reservoir with the train pipe reservoir chamber.

11. An air brake apparatus comprising a supporting plate, a triple valve connected thereto and formed of a service section and an emergency section, each of said sections being independently connected to said supporting plate, means in the service section operating upon a slow reduction in train pipe pressure to place the train pipe in communication with the brake cylinder for an application of the brakes by train pipe air alone, said means operating upon an increase of train pipe pressure to release the brakes, and means in the emergency section of the triple valve operating upon a sudden reduction in train pipe pressure to secure an emergency application of the brakes, the supporting brake being formed with ports and passages to connect the service and emergency sections of the triple valve and being also provided with ports and passages for the connection of the train pipe, emergency reservoir, train pipe reservoir and brake cylinder.

12. An air brake apparatus comprising a train pipe, a brake cylinder, an emergency reservoir, a train pipe reservoir, a supporting bracket formed with ports and passages, means connecting said ports and passages to the brake cylinder, emergency reservoir, and train pipe reservoir, a triple valve comprising a service section and an emergency section, means for independently connecting said sections to said supporting bracket, said bracket being formed with ports and passages for connecting together the service and emergency sections of the triple valve, means in the service section of the triple valve operating upon a slow reduction of train pipe pressure to place the train pipe in communication with the brake cylinder for a service application of the brakes by train pipe pressure alone, said means operating upon an increase of train pipe pressure to release the brakes, and means in the emergency section of the triple valve operating upon a sudden reduction in train pipe pressure to place the emergency reservoir in communication with the brake cylinder for an emergency application of the brakes.

13. A triple valve comprising means operating upon a slow reduction of train pipe pressure to admit train pipe air to the brake cylinder for a service application of the brakes, an emergency train pipe chamber, a movable abutment forming one wall of said chamber, an exhaust valve adapted to be operated by said abutment upon a sudden reduction of train pipe pressure, an emergency brake cylinder chamber, a movable abutment forming one wall of said chamber, a valve controlling admission to said emergency brake cylinder chamber and held closed by said abutment, a quick-action chamber between the said two abutments, a leak port being formed through the abutment forming the wall between the emergency train pipe chamber and the quick-action chamber, a slide valve chamber connected to the quick-action chamber, a slide valve therein, and a lever connected to said slide valve and to the movable abutment between the quick-action chamber and the emergency train pipe chamber and adapted upon a sudden reduction in train pipe pressure to move the slide valve to first place the emergency train pipe chamber in communication with the emergency brake cylinder chamber, and to then place the said emergency brake cylinder chamber in communication with the brake cylinder port in said slide valve chamber.

14. A triple valve comprising means operating upon a slow reduction of train pipe pressure to admit train pipe air to the brake cylinder for a service application of the brakes, an emergency train pipe chamber, a quick-action abutment forming one wall of said chamber, an exhaust valve adapted to be operated by said abutment upon a sudden reduction of train pipe pressure, an emergency brake cylinder chamber, an emergency abutment forming one wall of said chamber, a valve controlling communication between said chamber and the emergency reservoir and held closed by said emergency abutment, a quick-action chamber being formed between two said abutments and a leak port being formed through the quick-action abutment, a slide valve chamber connected to the quick-action chamber and provided with a brake cylinder port, a slide valve therein provided with ports venting the emergency brake cylinder chamber to atmosphere, and a lever connected to said slide valve and to the quick-action abutment and adapted upon a sudden reduction in train pipe pressure to move the slide valve to first close the exhaust to atmosphere, and to then place the emergency train pipe chamber in communication with the emergency brake cylinder chamber, and to then place the emergency brake cylinder chamber in communication with the brake cylinder port in said slide valve chamber.

15. In an air brake apparatus, a triple valve comprising an emergency section, a pair of diaphragms therein independently movable and spaced apart to form a quick-action chamber, an emergency train pipe chamber above one of said diaphragms, an emergency brake cylinder chamber below the other of said diaphragms, a lever in the emergency train pipe chamber, a train pipe exhaust valve connected to one end of said lever, the other end thereof being connected to the diaphragm, a slide valve chamber connected to the quick-action chamber and formed with a brake cylinder port, and a slide valve in said chamber controlling communication between the emergency brake cylinder chamber, the emergency train pipe chamber, and the brake cylinder port in said slide valve chamber, a lever in the quick-action chamber and connected to said slide valve and to the diaphragm forming a portion of the lower wall of the emergency train pipe chamber.

16. In an air brake apparatus, a triple valve comprising an emergency section, a quick-action abutment and an emergency abutment in said section, said abutments being spaced apart to form a quick-action chamber between them, the quick-action abutment having a greater movement than the emergency abutment, the quick-action abutment forming the lower wall of an emergency train pipe chamber and the emergency abutment forming the upper wall of an emergency brake cylinder chamber, a train pipe exhaust valve in the emergency train pipe chamber and operated by the quick-action abutment upon a sudden reduction in train pipe pressure, means to permit a slow equalization of pressures in the quick-action chamber and the emergency train pipe chamber, a spring to return the quick-action abutment toward its normal position when the pressures in the said two chambers have equalized, a slide valve chamber connected to the quick-action chamber and formed with a brake cylinder port, a slide valve therein provided with a port normally venting the emergency brake cylinder chamber to atmosphere and adapted to be moved to connect the emergency train pipe chamber with the emergency brake cylinder chamber and to then connect the emergency brake cylinder chamber to the brake cylinder port, a valve in the emergency brake cylinder chamber controlling communication between said chamber and the emergency reservoir and normally held closed by the emergency abutment, whereby upon an equalization of pressures in the quick-action and emergency train pipe chambers after an emergency application of the brakes, the quick-action abutment and the connected slide valves will be moved to close the exhaust port and to shut off communication between the emergency train pipe chamber and the slide valve chamber and to maintain communication between the emergency brake cylinder chamber and the brake cylinder port.

17. An air brake apparatus comprising a valve device, an emergency reservoir, a train pipe reservoir, means in the valve device operating upon a reduction of train pipe pressure to admit train pipe air to the brake cylinder for a service application of the brakes by train pipe air, a quick-release diaphragm, a slide valve having ports controlling communication between the emergency reservoir, the train pipe and train pipe reservoir, and a quick-release lever connected to said diaphragm and to said valve, said diaphragm operating upon a reduction of brake pipe pressure to move said slide valve to connect the train pipe reservoir to the train pipe said diaphragm operating upon an increase of train pipe pressure for a release of the brakes to move said slide valve to permit emergency reservoir air to flow to the train pipe and to the train pipe reservoir.

18. An air brake apparatus comprising a valve device, an emergency reservoir, a train pipe reservoir, a train pipe, means in the valve device operating upon a reduction of train pipe pressure to admit train pipe air to the brake cylinder for a service application of the brakes and to connect the train pipe reservoir to the train pipe, this latter means disconnecting the train pipe reservoir from the train pipe when the valve device is in normal or lap position, and means also in said valve device operating upon an increase of train pipe pressure to connect the emergency reservoir to the train pipe and the train pipe reservoir to effect a quick release of the brakes.

19. An air brake apparatus comprising a valve device, an emergency reservoir, a train pipe reservoir, means in the valve device operating upon a reduction of train pipe pressure to admit train pipe air to the brake cylinder for a service application of the brakes, a slide valve having ports controlling communication between the train pipe and the train pipe reservoir and between the emergency reservoir and the train pipe, and means in said valve device operating upon a reduction of brake pipe pressure for an application of the brakes to move said slide valve to connect the train pipe reservoir to the train pipe, said means operating upon an increase of train pipe pressure for a release of the brakes to move said slide valve to connect the emergency reservoir to the train pipe and to the train pipe reservoir.

In testimony whereof I hereunto affix my signature.

SPENCER G. NEAL.